US009589331B2

(12) United States Patent
Theis (10) Patent No.: US 9,589,331 B2
(45) Date of Patent: Mar. 7, 2017

(54) METHOD AND APPARATUS FOR DETERMINING A DETECTION OF A DEFECTIVE OBJECT IN AN IMAGE SEQUENCE AS A MISDETECTION

(71) Applicant: THOMSON LICENSING, Issy de Moulineaux (FR)

(72) Inventor: Oliver Theis, Kalletal (DE)

(73) Assignee: Thomson Licensing, Issy de Moulineaux (FR)

( * ) Notice: Subject to any disclaimer, the term of this patent is extended or adjusted under 35 U.S.C. 154(b) by 0 days.

(21) Appl. No.: 14/878,238

(22) Filed: Oct. 8, 2015

(65) Prior Publication Data
US 2016/0104269 A1    Apr. 14, 2016

(30) Foreign Application Priority Data

Oct. 8, 2014   (EP) .................................... 14306575

(51) Int. Cl.
*G06K 9/42*   (2006.01)
*G06T 5/00*   (2006.01)
(Continued)

(52) U.S. Cl.
CPC ............ *G06T 5/005* (2013.01); *G06K 9/6215* (2013.01); *G06T 5/30* (2013.01); *G06T 5/50* (2013.01);
(Continued)

(58) Field of Classification Search
CPC ....... G06T 5/005; G06T 2210/44; G06T 5/50; G06T 7/0002; G06T 7/2033;
(Continued)

(56) References Cited

U.S. PATENT DOCUMENTS

| 7,440,608 B2* | 10/2008 | Silverstein ............. G06T 7/001 348/125 |
| 2005/0286753 A1* | 12/2005 | Ho ......................... H04N 17/04 382/141 |

(Continued)

OTHER PUBLICATIONS

Güllü et al. "Scratch detection via temporal coherency analysis and removal using edge priority based interpolation", 2006 IEEE Int. Symposium on Circuits and Systems, 2006; pp. 4591-4594.

(Continued)

*Primary Examiner* — Yon Couso
(74) *Attorney, Agent, or Firm* — Tuntunjian & Bitetto, P.C.

(57) ABSTRACT

Results of automatic detection of dirt or other non-steady defects in a sequence of digitized image frames can be unreliable. Here, a determination of a detection of a defective object to be replaced by a replacement pattern in a frame of a sequence of image frames as a misdetection is presented that comprises determining a value of a first similarity measure between a boundary of the detected defective object and a boundary of the replacement pattern and determining a value of a second similarity measure between the detected defective object and the replacement pattern. The detection of the defective object is determined as a misdetection if at least one of the following holds true: the value of the first similarity measure is outside of a corresponding first similarity acceptance range and the value of the second similarity measure is inside of a corresponding second similarity acceptance range.

19 Claims, 3 Drawing Sheets

(51) Int. Cl.
| | |
|---|---|
| *H04N 1/409* | (2006.01) |
| *H04N 5/217* | (2011.01) |
| *H04N 5/253* | (2006.01) |
| *G06K 9/62* | (2006.01) |
| *G06T 5/30* | (2006.01) |
| *G06T 5/50* | (2006.01) |
| *G06T 7/00* | (2006.01) |
| *G06T 7/20* | (2006.01) |

(52) U.S. Cl.
CPC .......... *G06T 7/0002* (2013.01); *G06T 7/2033* (2013.01); *H04N 1/4097* (2013.01); *H04N 5/2171* (2013.01); *H04N 5/253* (2013.01); *G06T 2207/10016* (2013.01); *G06T 2210/44* (2013.01)

(58) Field of Classification Search
CPC ............ G06T 2207/10016; G06T 5/30; H04N 1/4097; H04N 5/2171; H04N 5/253; G06K 9/6215

USPC ......................................................... 382/257
See application file for complete search history.

(56) References Cited

U.S. PATENT DOCUMENTS

| | | |
|---|---|---|
| 2006/0115178 A1 | 6/2006 | Fan et al. |
| 2006/0210191 A1 | 9/2006 | Siverstein |
| 2010/0002772 A1 | 1/2010 | Vandame |
| 2011/0038537 A1 | 2/2011 | Rising |

OTHER PUBLICATIONS

Araujo et al. "A New Approach for Old Movie Restoration", SPIE Proceedings vol. 4308, pp. 67-77, 2001.
Kuldiloke et al. "Region Substitution in Video Using Graph Cuts", 2009 6th Int. Conf. On Electrical Engineering/Electronics, Computer, Telecommunications and Information Technology (ECTO-CON), 2009; IEEE, pp. 1-4.
Schindler et al. "Object Detection by Global Contour Shape", Pattern Recognition vol. 41(12), pp. 3736-3748, Pergamon-Elzevier Science Ltd., Dec. 2008.
Tilie et al. "A contrario False Alarms Removal for Improving Blotch Detection in Digitized Films Restoration", 2007; pp. 410-413.
Corrigan et al. "Pathological Motion Detection for Robust Missing Data Treatment in Degraded Archived Media", IEEE ICIP 2006, pp. 621-624.
Licsar et al. "Trainable Post-Processing Method to Reduce False Alarms in the Detection of Small Blotches of Archive Film", IEEE ICIP 2005, pp. II562-II565.
Van Roosmalen et al. "Restoration and Storage of Film and Video Archive Material", in "Signal Processing for Multimedia", J. S. Byrnes Ed., IOS Press, 1999; pp. 167-191.
Search Report Dated Mar. 19, 2015.

\* cited by examiner

METHOD AND APPARATUS FOR DETERMINING A DETECTION OF A DEFECTIVE OBJECT IN AN IMAGE SEQUENCE AS A MISDETECTION

This application claims the benefit, under 35 U.S.C. §119 of European Patent Application No. 14306575.3, filed Oct. 8, 2014.

FIELD

A method and an apparatus for false alarm identification for defect detection in digitized image sequences, e.g. for digital motion picture processing, are presented. In particular, the present disclosure relates to a method and an apparatus for determining a detection of a defective object, such as dirt, in a frame of a sequence of image frames as a misdetection, and to a corresponding computer readable storage medium.

BACKGROUND

Motion picture films are often affected by defects, i.e. undesirable objects such as scratches, dust, dirt, stains, abrasion etc. They usually originate from the technical process of developing, handling, storing, and screening or scanning the material. In some rare cases static objects may already be induced during capturing, for example fluff within a lens or dirt on a scanner glass. However, a very common defect is non-steady dirt, i.e. undesired objects that appear only for a single frame.

For archival and conservation purposes and for making use of the benefits of a digital representation, analogue motion picture films are scanned and digitally encoded. Restoration of the films can, therefore, be carried out in the digital domain after scanning. Instead of time consuming manual restoration of the digitized films by finding and removing each object, application of automatic restoration software with algorithms trying to detect and remove dirt objects is a cost saving alternative to manual workflow.

In a workflow for automatic film restoration, defective objects, such as dirt, can be detected automatically and the image region containing the detected defective object or blotch can be replaced by true image data, e.g. taken from another image frame of the sequence, such as for example a preceding image frame.

It is a common problem of automatic detection algorithms that defective objects remain undetected (false negative) or detected defective objects are wrongly detected, i.e. misdetected (false positive). Therefore, a semiautomatic restoration framework may provide a review step between detection and removal that allows an operator to deselect wrongly detected defective objects for preventing removal or mark undetected regions as defective objects. As an example, a restoration framework that organizes restoration related information in a metadata structure may provide a binary flag, e.g. named 'remove', for deselecting objects, which defaults to 'true' after detection of the potentially defective object and can be manually switched to 'false' within the review process.

Instead of performing a time consuming manual adjustment of the detection result, the amount of misdetections can be reduced prior to the review step by an automatic post-processing of the initial detection result, potentially superseding the manual adjustment.

P. M. B. von Roosmalen et al. noticed in "Restoration and Storage of Film and Video Archive Material" in Signal Processing for Multimedia, J. S. Byrnes (Ed.), IOS Press, 1999, that misdetections may occur due to noise and presented a probabilistic method for false alarm reduction.

In 2005, Attila Licsar et al. presented in "Trainable Post-Processing Method To Reduce False Alarms In The Detection of Small Blotches Of Archive Film", IEEE International Conference on Image Processing, ICIP 2005, a blotch-analyzing ("post-processing") step where the brightness (luminance channel) of the image is analyzed and regions are classified as blotch or as real object (no blotch). This classification is done by a feed-forward neural network trained by the image features of the detected blotches.

In 2006, D. Corrigan et al. pointed out in "Pathological Motion Detection for Robust Missing Data Treatment in Degraded Archived Media", IEEE International Conference on Image Processing, ICIP 2006, that especially long-term pathological motion is a common source of falsely detected dirt. They presented a probabilistic framework using a five frames wide temporal window.

In 2007, S. Tilie et al. proposed in "A contrario False Alarms Removal for Improving Blotch Detection in Digitized Films Restoration", 14th International Workshop on Systems, Signals and Image Processing, 2007 and 6th EURASIP Conference focused on Speech and Image Processing, Multimedia Communications and Services, a high level method for false alarm detection that looks for "spatio-temporal alignment of detected pixels".

However, these approaches are often either computationally intensive or lack accuracy.

There remains a need for a method and an apparatus for automatically determining, reliably and efficiently, whether a detection of an object detected in a frame of an image sequence as being defective, e.g. a potential dirt object, is a misdetection, i.e. a false alarm, thereby, e.g., avoiding that restoration of misdetected objects reduces a quality of a restored image sequence.

SUMMARY

A method and an apparatus for determining a detection of a defective object to be replaced by a replacement pattern in a frame of a sequence of image frames as a misdetection are suggested, as well as a computer readable storage medium.

According to an aspect of the present principles, a method for determining a detection of a defective object to be replaced by a replacement pattern in a frame of a sequence of image frames as a misdetection comprises determining a value of a first similarity measure between a boundary of the detected defective object and a boundary of the replacement pattern;

determining a value of a second similarity measure between pixels enclosed by the boundary of the detected defective object and pixels enclosed by the boundary of the replacement pattern; and determining the detection of the defective object as a misdetection if at least one of the following holds true: the value of the first similarity measure is outside of a corresponding first similarity acceptance range and the value of the second similarity measure is inside of a corresponding second similarity acceptance range.

Accordingly, an apparatus for determining a detection of a defective object to be replaced by a replacement pattern in a frame of a sequence of image frames as a misdetection comprises a first similarity determination unit configured to determine a value of a first similarity measure between a boundary of the detected defective object and a boundary of the replacement pattern;

a second similarity determination unit configured to determine a value of a second similarity measure between pixels enclosed by the boundary of the detected defective object and pixels enclosed by the boundary of the replacement pattern; and a misdetection determination unit configured to determine the detection of the defective object as a misdetection if at least one of the following holds true: the value of the first similarity measure is outside of a corresponding first similarity acceptance range and the value of the second similarity measure is inside of a corresponding second similarity acceptance range.

Units comprised in the apparatus, such as the first similarity determination unit, the second similarity determination unit and the misdetection determination unit may, for example, be provided as separate devices, jointly as at least one device or logic circuitry, or functionality carried out by a microprocessor, microcontroller or other processing device, computer or other programmable apparatus.

According to an aspect of the present principles, an apparatus for determining a detection of a defective object to be replaced by a replacement pattern in a frame of a sequence of image frames as a misdetection comprises a processing device and a memory device storing instructions that, when executed, cause the apparatus to perform the described method steps.

Further, a computer readable storage medium has stored therein instructions enabling determination of a detection of a defective object to be replaced by a replacement pattern in a frame of a sequence of image frames as a misdetection, wherein the instructions, when executed by a computer, cause the computer to:

determine a value of a first similarity measure between a boundary of the detected defective object and a boundary of the replacement pattern;

determine a value of a second similarity measure between pixels enclosed by the boundary of the detected defective object and pixels enclosed by the boundary of the replacement pattern; and determine the detection of the defective object as a misdetection if at least one of the following holds true: the value of the first similarity measure is outside of a corresponding first similarity acceptance range and the value of the second similarity measure is inside of a corresponding second similarity acceptance range.

The computer readable storage medium tangibly embodies a program of instructions, which, when executed by a computer, cause the computer to perform the described method steps.

The terms "first similarity measure" and "second similarity measure" refer to different similarity measures or metrics.

A value of a similarity measure being outside of a corresponding similarity acceptance range is considered an indication for dissimilarity, whereas a value of a similarity measure being inside of a corresponding similarity acceptance range is considered an indication for acceptable similarity or sufficient identity. As an example, a value being outside of a similarity acceptance range can be a value above a similarity acceptance threshold, while a value being inside of the similarity existence range can be a value at or below the similarity acceptance threshold.

The solution according to the aspects of the present principles allows to determine whether or not a detection of a potentially defective object in a frame of an image sequence, that is to be replaced by a replacement pattern, i.e. a set of image pixels previously determined of being potentially suitable for replacing the pixels of the defective object within the image frame, is a misdetection. In case of a misdetection, the replacement pattern will be found unsuitable for correcting the image frame by replacing the defective object.

Misdetections can be identified by checking if the similarity between the boundary of the defective object and the boundary of the candidate replacement pattern is outside of a first acceptance range and if the similarity between the defective object within its boundary and the replacement pattern is inside of a second acceptance range. In other words, if a pattern can be provided, e.g. from a preceding or a succeeding frame, that has a similar boundary, i.e. a similar shape, but the object pattern looks very different from the replacement pattern, a defect has been correctly detected. Otherwise, i.e. if either no suitable replacement pattern with a similar boundary can be found, or if a suitably shaped replacement pattern looking quite the same can be found, the detected object will not be considered a correctly detected defect (as there is no need for replacing the detected defective object) and will, therefore, be considered a misdetection.

The provided solution at least has the effect that a potential manual review process is shortened and simplified due to a lower number of misdetections and may potentially be omitted at all.

Although the misdetection determination solution allows false alarm identification of wrongly detected non-steady dirt, where dirt is defined as a certain type of temporal incoherence, it is also applicable, e.g., to footage without dirt, for example directly captured by digital video cameras, for improvement of reliability of detection results of temporal incoherences.

In general, the replacement pattern can be any region of continuous pixels that is determined as suitable for replacing the particular detected defective object. For example, in an embodiment the replacement pattern can be determined from an image library, selected for example depending on the content of the image sequence containing the defective objects.

In an embodiment the replacement pattern for the detected defective object is determined from at least one of a preceding frame and a succeeding frame of the sequence. Since in most cases temporal coherence between the image frames of the sequence can be assumed and can be taken into account for determining the candidate defective object, a potential replacement pattern is also very likely identifiable within a preceding and/or a succeeding frame or may be generated from a combination of these. In an embodiment the terms "preceding frame" and "succeeding frame" refer to the directly neighboring frames of the frame containing the detected defective object. In another embodiment at least one of the "preceding frame" and the "succeeding frame" can be a frame of the sequence located before or after the frame but without directly neighboring said frame.

In an example embodiment the replacement pattern is determined as a closest match of the boundary of the detected defective object in at least one of the preceding and the succeeding frames. The term "boundary of the detected defective object" refers to a set of pixels enclosing the area of the detected defective object, wherein in one embodiment the enclosing set of pixels comprises at least the pixels bordering the object but in another embodiment comprises a region enclosing the detected defective object, wherein the region comprises more pixels than the pixels actually directly bordering the object. The replacement pattern is determined as the region within a preceding or succeeding frame that is enclosed by a boundary line or boundary region that matches best the potentially corresponding boundary line or boundary region of the detected defective object.

In an example embodiment the closest match is determined by a minimum mean square error of pixels of the frame corresponding to the boundary of the detected defective object and a plurality of corresponding potential replacement pattern boundaries in at least one of the preceding and succeeding frames. Corresponding potential replacement pattern boundaries to be tested against the boundary of the detected defective object are identified within a defined search radius or search area around the area corresponding to the area of the defective detected object, which may or may not take into account motion compensation between the frame containing the detected defective object and the frame or frames of the potential replacement pattern. The best match may, for example, be identified as the replacement pattern that results in the minimum mean square error between the boundary of the replacement pattern and the boundary of the detected defective object.

In an embodiment the determining of a value of the first similarity measure comprises determining at least one of a mean square error and a correlation between the boundary of the detected defective object and the boundary of the replacement pattern. The term "correlation" refers to a 2-D correlation coefficient. In another embodiment, e.g. for enhanced processing speed, the correlation may be determined by 1-D line-wise or column-wise correlation coefficients. Other similarity measures or combinations thereof may be used additionally or instead. In this context, a difference measure is a similarity measure, wherein the value of the measure is interpreted conversely.

In an embodiment the determining of a value of the second similarity measure comprises determining at least one of a mean square error and a correlation between pixels enclosed by the boundary of the detected defective object and pixels enclosed by the boundary of the replacement pattern. In other words, the second similarity measure quantifies a similarity between the area of the detected defective object and the best matching potential replacement pattern, whereas the first similarity measure quantifies a similarity between their boundaries (lines or regions).

While not explicitly described, the present embodiments may be employed in any combination or sub-combination.

DETAILED DESCRIPTION OF EMBODIMENTS

For a better understanding, the present principles will now be explained in more detail in the following description with reference to the drawings. It is understood that the present principles are not limited to these exemplary embodiments and that specified features can also expediently be combined and/or modified without departing from the scope of the present principles as defined in the appended claims.

Figure 1:
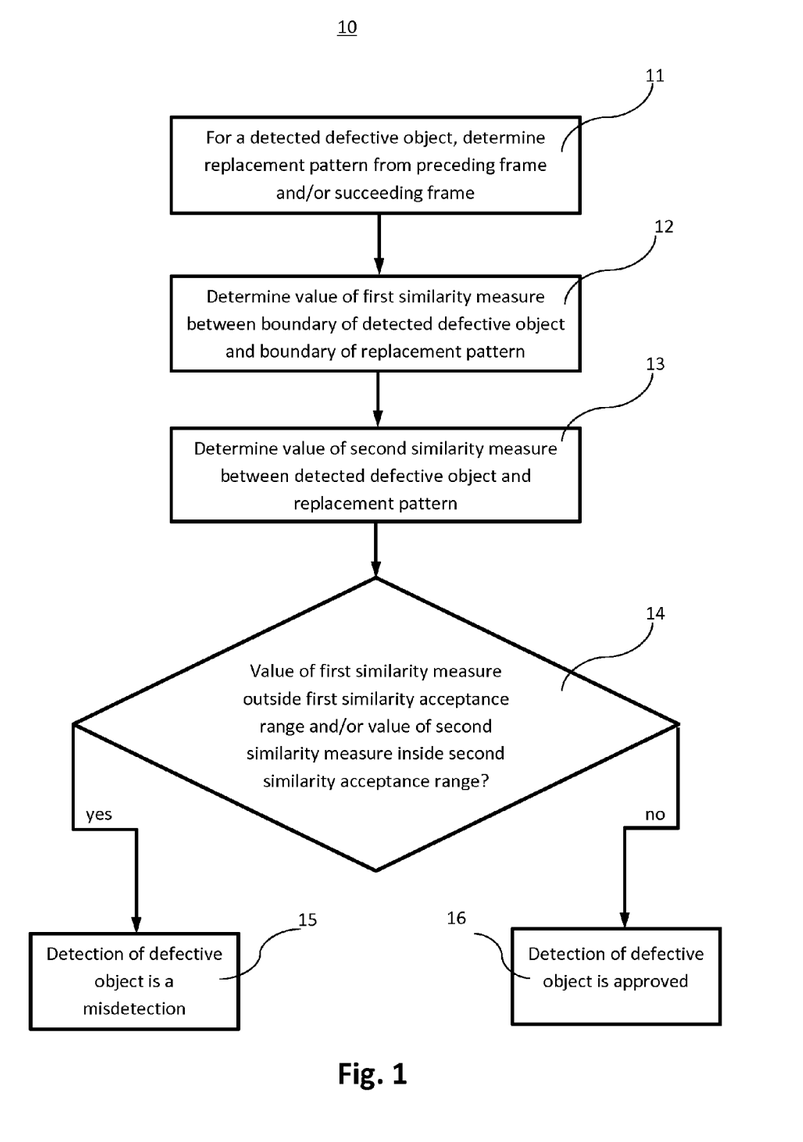
FIG. 1 schematically illustrates an embodiment of a method for determining a detection of a defective object to be replaced by a replacement pattern in a frame of a sequence of image frames as a misdetection.

Referring to FIG. 1, an embodiment of a method 10 for determining a detection of a defective object to be replaced by a replacement pattern in a frame of a sequence of image frames as a misdetection is schematically shown.

In the shown embodiment an object is already identified as potentially defective and in a first shown step 11 the replacement pattern for the detected defective object is determined from at least one of a preceding frame and a succeeding frame of the sequence. In another embodiment a best match for a replacement pattern may also be already determined.

In a next step 12 a value of a first similarity measure between a boundary of the detected defective object and a boundary of the replacement pattern is determined.

In a next step 13 a value of a second similarity measure between the detected defective object and the replacement pattern is determined. The steps of determining the first similarity measure 12 and the second similarity measure 13 may, for example, be executed consecutively or concurrently.

In an evaluation step 14 the detection of the defective object is determined as a misdetection if at least one of the following holds true: the value of the first similarity measure is outside of a corresponding first similarity acceptance range and the value of the second similarity measure is inside of a corresponding second similarity acceptance range.

As a result, the detection of the defective object is either considered a misdetection 15, or the detection of the defective object is approved 16, i.e. considered to be correct.

Figure 2:
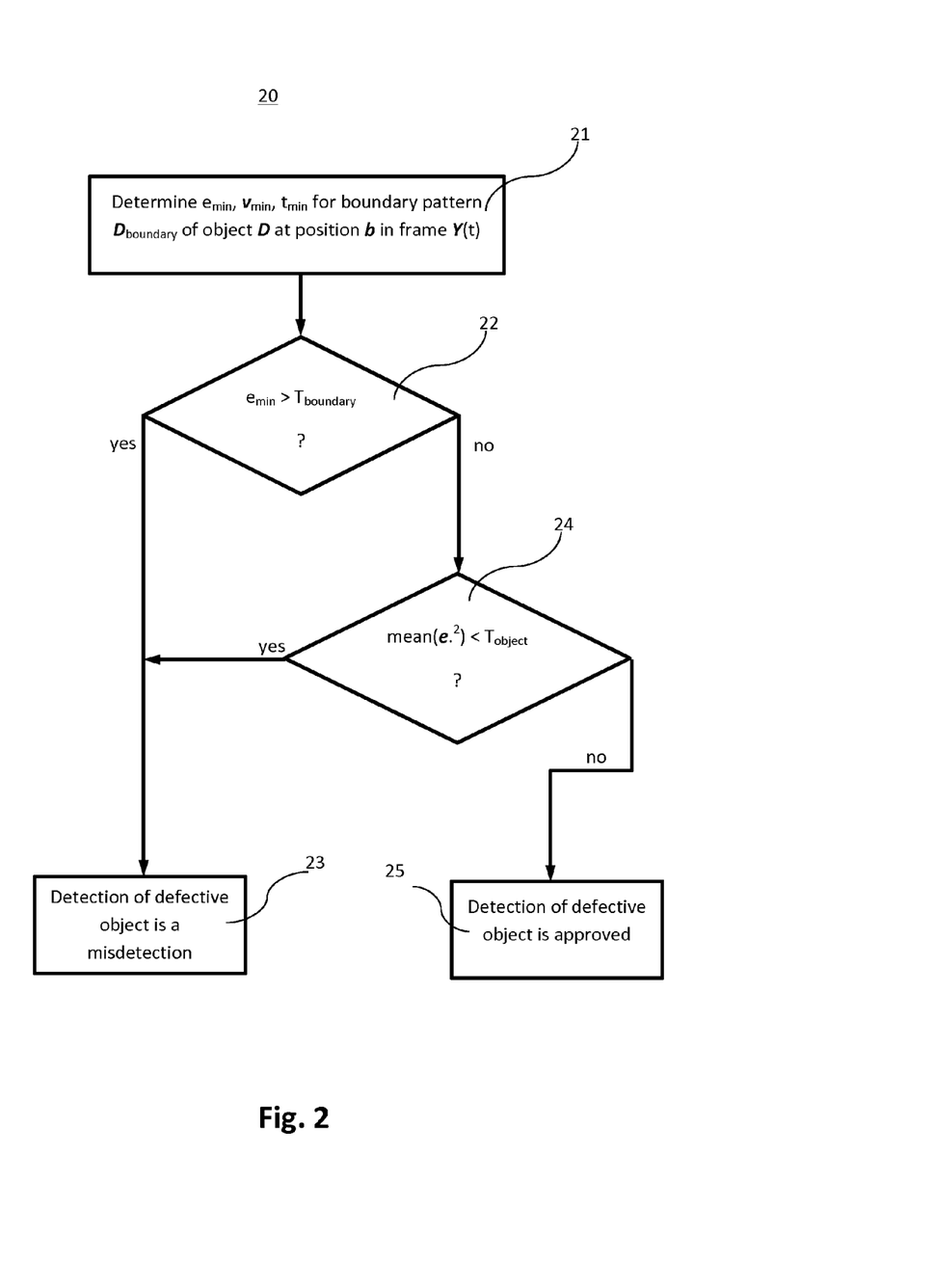
FIG. 2 schematically illustrates another embodiment of a method for determining a detection of a defective object to be replaced by a replacement pattern in a frame of a sequence of image frames as a misdetection.

Referring to FIG. 2, another embodiment of a method 20 for determining a detection of a defective object to be replaced by a replacement pattern in a frame of a sequence of image frames as a misdetection is schematically shown.

The method identifies false alarms in an automatic detection result of potential defective objects, i.e. non-steady dirt objects in digitized film sequences. It is assumed that each frame with temporal index t has a single channel representation $Y(t)$, e.g. luma or luminance information, of the original content $O(t)$, which might be a matrix of RGB or YUV triples, or only a single channel grayscale representation (in this case $Y(t)$ might be chosen equal to $O(t)$).

It is assumed that n non-steady dirt objects, i.e. continuous regions of missing data within a single frame, have already been identified. At this point no information about the validity of detected objects is available. According to the embodiment, the detected objects are validated, i.e. false alarms are identified, by comparing detected objects with potential replacement patterns.

The validation processing employs that the similarity between the object boundary and the replacement pattern boundary should be large, while the similarity between the object and the replacement pattern itself should be small.

The processing is applied to each object n.

In a first processing step 21, for a frame representation $Y(t)$ the minimum mean square error (MMSE) $e_{min}$ of pixels corresponding to a shape boundary $D_{boundary}$ pattern of a detected object D to all corresponding boundaries of shifted potential replacement patterns in, e.g., $Y(t-1)$ and/or $Y(t+1)$ within a search radius s, as well as a corresponding spatial replacement vector $v_{min}$ and a corresponding temporal replacement vector $t_{min}$ are determined for the defective object defined by its mask D and position b within frame Y(t).

The computation may, for example, be performed by computing arrays of the backward and forward mean square distances, e.g. Euclidian distances:

$$E_-(i=x+s+1, j=y+s+1) = \text{mean}((Y(\text{shift}(D_{boundary}, b)t) - Y(\text{shift}(D_{boundary}, b+[x,y]), t-1))^{\cdot 2}),$$

$$E_+(i=x+s+1, j=y+s+1) = \text{mean}((Y(\text{shift}(D_{boundary}, b)t) - Y(\text{shift}(D_{boundary}, b+[x,y]), t+1))^{\cdot 2}),$$

The corresponding displacement vectors for indices $j_{min-}$, $i_{min-}$ and $j_{min+}$, $i_{min+}$ are determined by $$v_{min-} = [j_{min-} - s - 1, i_{min-} - s - 1],$$

$$v_{min+} = [j_{min+} - s - 1, i_{min+} - s - 1].$$

$e_{min}$ is then determined as $\min(\min(E_-), \min(E_+))$.

$v_{min}$ is selected depending on $e_{min}$ being either equal to $\min(E_-)$ or $\min(E_+)$. In the example, $t_{min}$ is either $-1$ or $+1$, depending on $e_{min}$.

In a second processing step 22 a similarity check between the boundary of the detected defective object and the replacement pattern boundary identified as best match corresponding to $e_{min}$ is performed by comparing $e_{min}$ to a threshold $T_{boundary}$. The detection is considered a misdetection 23 if the found best match replacement pattern resulting in the minimum mean square error is above $T_{boundary}$, i.e. if the dissimilarity of the boundaries of the detected defective object and the replacement pattern is beyond an acceptable limit $T_{boundary}$.

In a third processing step 24 a similarity check between the object D and the replacement pattern is performed by comparing their distance in the sense of a mean square error (MSE) to a threshold $T_{object}$:

$$e = Y(\text{shift}(D, b), t) - Y(\text{shift}(D, b+v_{min}), t+t_{min})$$

If the mean square error $\text{mean}(e^{\cdot 2})$ is found below $T_{object}$, the detection is considered a misdetection 23. Otherwise, D is approved to be a correctly detected defective object 25.

Figure 3:
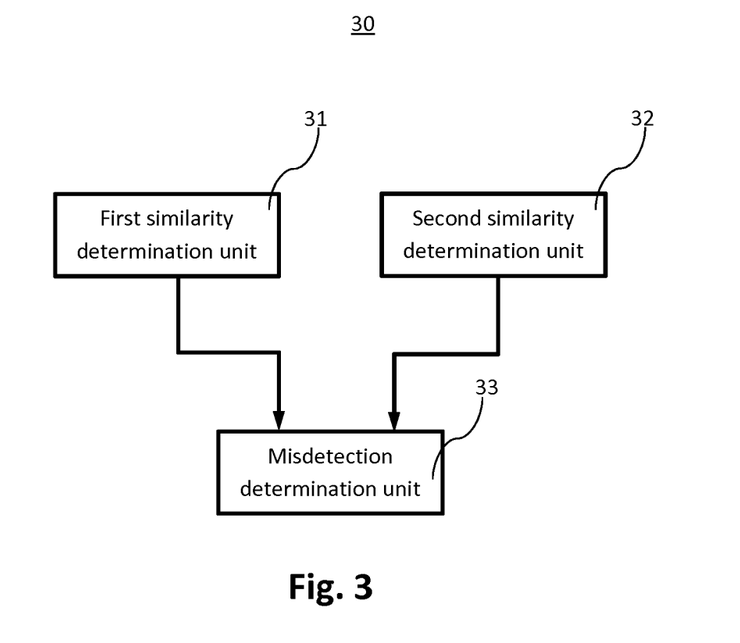
FIG. 3 schematically illustrates an embodiment of an apparatus for determining a detection of a defective object to be replaced by a replacement pattern in a frame of a sequence of image frames as a misdetection.
Figure 4:
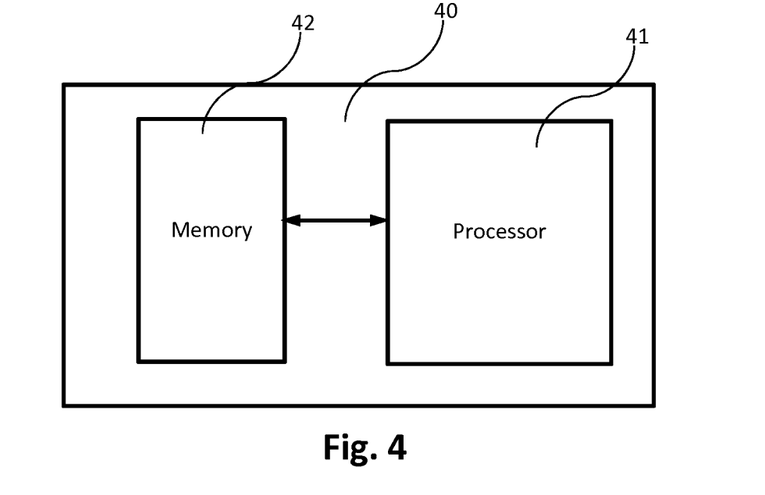
FIG. 4 schematically illustrates another embodiment of an object to be replaced by a replacement pattern in a frame of a sequence of image frames as a misdetection.

Referring now to FIG. 3 and FIG. 4, embodiments of apparatuses for determining a detection of a defective object to be replaced by a replacement pattern in a frame of a sequence of image frames as a misdetection are schematically shown. The apparatus shown in FIG. 3 and the apparatus shown in FIG. 4 allow implementing the advantages and characteristics of the described method for determining a detection of a defective object as a misdetection as part of an apparatus for determining a detection of a defective object to be replaced by a replacement pattern in a frame of a sequence of image frames as a misdetection.

The apparatus 30 shown in FIG. 3 comprises a first similarity determination unit 31 configured to determine a value of a first similarity measure between a boundary of the detected defective object and a boundary of the replacement pattern.

The apparatus 30 further comprises a second similarity determination unit 32 configured to determine a value of a second similarity measure between the detected defective object and the replacement pattern. In another embodiment the first similarity determination unit 31 and the second similarity determination unit 32 can be provided as a combined similarity determination unit.

Further, the apparatus 30 comprises a misdetection determination unit 33 connected to receive at least the value of the first similarity measure and the value of the second similarity measure and configured to determine the detection of the defective object as a misdetection if at least one of the following holds true: the value of the first similarity measure is outside of a corresponding first similarity acceptance range and the value of the second similarity measure is inside of a corresponding second similarity acceptance range.

In an embodiment the apparatus 30 comprises at least one memory (not shown). In another embodiment, the apparatus 30 does not contain the memory but is connected or connectable to the memory by means of an interface.

In the embodiment shown in FIG. 3 the first similarity determination unit 31, the second similarity determination unit 32 and the misdetection determination unit 33 directly communicate with each other. In another embodiment the apparatus comprises a controller unit connected at least to one or more of the first similarity determination unit 31, the second similarity determination unit 32 and the misdetection determination unit 33 and controls their communication.

Units comprised in the embodiment of the apparatus shown in FIG. 3 may, for example, be provided as separate devices, jointly as at least one device or logic circuitry, or functionality carried out by a microprocessor, microcontroller or other processing device, computer or other programmable apparatus.

As shown in FIG. 4, an embodiment of an apparatus 40 for determining a detection of a defective object to be replaced by a replacement pattern in a frame of a sequence of image frames as a misdetection comprises a processing device 41 and a memory device 42 storing instructions that, when executed, cause the apparatus to perform steps according to one of the described methods.

For example, the processing device can be a processor adapted to perform the steps according to one of the described methods. In an embodiment said adaptation comprises that the processor is configured, i.e. for example programmed, to perform steps according to one of the described methods.

In an embodiment, the apparatus 30 or 40 is a device being part of another apparatus or system, such as, for example, a video processing framework.

As will be appreciated by one skilled in the art, aspects of the present principles can be embodied as an apparatus, a system, method or computer readable medium. Accordingly, aspects of the present principles can take the form of a hardware embodiment, a software embodiment or an embodiment combining software and hardware aspects. Furthermore, aspects of the present principles can take the form of a computer readable storage medium. Any combination of one or more computer readable storage medium(s) may be utilized.

Aspects of the present principles may, for example, at least partly be implemented in a computer program comprising code portions for performing steps of the method according to the present principles when run on a programmable apparatus or enabling a programmable apparatus to perform functions of an apparatus or system according to the present principles.

Further, any shown connection may be a direct or an indirect connection. Furthermore, those skilled in the art will recognize that the boundaries between logic blocks are merely illustrative and that alternative embodiments may merge logic blocks or impose an alternate decomposition of functionality upon various logic blocks.

The invention claimed is:

1. A method for determining a detection of a defective object to be replaced by a replacement pattern in a frame of a sequence of image frames as a misdetection, comprising:

determining a value of a first similarity measure between a boundary of the detected defective object and a boundary of the replacement pattern;

determining a value of a second similarity measure between pixels enclosed by the boundary of the detected defective object and pixels enclosed by the boundary of the replacement pattern; and determining the detection of the defective object as a misdetection if at least one of the following holds true: the value of the first similarity measure is outside of a corresponding first similarity acceptance range and the value of the second similarity measure is inside of a corresponding second similarity acceptance range.

2. The method according to claim 1, further comprising:

for the detected defective object, determining the replacement pattern from at least one of a preceding frame and a succeeding frame of the sequence.

3. The method according to claim 2, wherein the replacement pattern is determined as a closest match of the boundary of the detected defective object in at least one of the preceding and the succeeding frames.

4. The method according to claim 3, wherein the closest match is determined by a minimum mean square error of pixels of the frame corresponding to the boundary of the detected defective object and a plurality of corresponding potential replacement pattern boundaries in at least one of the preceding and succeeding frames.

5. The method according to claim 1, wherein the determining of a value of the first similarity measure comprises determining at least one of a mean square error and a correlation between the boundary of the detected defective object and the boundary of the replacement pattern.

6. The method according to claim 1, wherein the determining of a value of the second similarity measure comprises determining at least one of a mean square error and a correlation between pixels enclosed by the boundary of the detected defective object and pixels enclosed by the boundary of the replacement pattern.

7. An apparatus for determining a detection of a defective object to be replaced by a replacement pattern in a frame of a sequence of image frames as a misdetection, comprising:

a first similarity determination unit configured to determine a value of a first similarity measure between a boundary of the detected defective object and a boundary of the replacement pattern;

a second similarity determination unit configured to determine a value of a second similarity measure between pixels enclosed by the boundary of the detected defective object and pixels enclosed by the boundary of the replacement pattern; and a misdetection determination unit configured to determine the detection of the defective object as a misdetection if at least one of the following holds true: the value of the first similarity measure is outside of a corresponding first similarity acceptance range and the value of the second similarity measure is inside of a corresponding second similarity acceptance range.

8. The apparatus according to claim 7, further comprising:

a replacement determination unit configured to determine for the detected defective object the replacement pattern from at least one of a preceding frame and a succeeding frame of the sequence.

9. The apparatus according to claim 8, wherein the replacement determination unit is configured to determine the replacement pattern as a closest match of the boundary of the detected defective object in at least one of the preceding and the succeeding frames.

10. The apparatus according to claim 9, wherein the replacement determination unit is configured to determine the closest match by a minimum mean square error of pixels of the frame corresponding to the boundary of the detected defective object and a plurality of corresponding potential replacement pattern boundaries in at least one of the preceding and succeeding frames.

11. The apparatus according to claim 7, wherein the first similarity determination unit is configured to determine a value of the first similarity measure depending on a determination of at least one of a mean square error and a correlation between the boundary of the detected defective object and the boundary of the replacement pattern.

12. The apparatus according to claim 7, wherein the second similarity determination unit is configured to determine a value of the second similarity measure depending on a determination of at least one of a mean square error and a correlation between pixels enclosed by the boundary of the detected defective object and pixels enclosed by the boundary of the replacement pattern.

13. An apparatus for determining a detection of a defective object to be replaced by a replacement pattern in a frame of a sequence of image frames as a misdetection, comprising:

a processing device; and
a memory device storing instructions that, when executed, cause the apparatus to perform the method according to claim 1.

14. A non-transitory computer readable storage medium having stored therein instructions enabling determination of a detection of a defective object to be replaced by a replacement pattern in a frame of a sequence of image frames as a misdetection, wherein the instructions, when executed by a computer, cause the computer to:

determine a value of a first similarity measure between a boundary of the detected defective object and a boundary of the replacement pattern;

determine a value of a second similarity measure between pixels enclosed by the boundary of the detected defective object and pixels enclosed by the boundary of the replacement pattern; and determine the detection of the defective object as a misdetection if at least one of the following holds true: the value of the first similarity measure is outside of a corresponding first similarity acceptance range and the value of the second similarity measure is inside of a corresponding second similarity acceptance range.

15. The non-transitory computer readable storage medium according to claim 14, wherein the instructions, when executed by the computer, cause the computer to, for the detected defective object, determine the replacement pattern from at least one of a preceding frame and a succeeding frame of the sequence.

16. The non-transitory computer readable storage medium according to claim 15, wherein the replacement pattern is determined as a closest match of the boundary of the detected defective object in at least one of the preceding and the succeeding frames.

17. The non-transitory computer readable storage medium according to claim 16, wherein the closest match is determined by a minimum mean square error of pixels of the frame corresponding to the boundary of the detected defective object and a plurality of corresponding potential replacement pattern boundaries in at least one of the preceding and succeeding frames.

18. The non-transitory computer readable storage medium according to claim 14, wherein the determining of a value of the first similarity measure comprises determining at least one of a mean square error and a correlation between the boundary of the detected+defective object and the boundary of the replacement pattern.

19. The non-transitory computer readable storage medium according to claim 14, wherein the determining of a value of the second similarity measure comprises determining at least one of a mean square error and a correlation between pixels enclosed by the boundary of the detected defective object and pixels enclosed by the boundary of the replacement pattern.

* * * * *